US011631977B2

(12) United States Patent
Beez et al.

(10) Patent No.: US 11,631,977 B2
(45) Date of Patent: Apr. 18, 2023

(54) METHOD OF OPERATING A CHARGING SYSTEM WITH MULTIPLE CHARGING POINTS

(71) Applicant: Mahle International GmbH, Stuttgart (DE)

(72) Inventors: Steve Beez, Masserberg (DE); Sebastian Ewert, Stuttgart (DE); Nicole Heinrich, Freiberg (DE); Walter Krepulat, Stuttgart (DE)

(73) Assignee: Mahle International GmbH

(*) Notice: Subject to any disclaimer, the term of this patent is extended or adjusted under 35 U.S.C. 154(b) by 195 days.

(21) Appl. No.: 16/422,402

(22) Filed: May 24, 2019

(65) Prior Publication Data

US 2019/0359077 A1 Nov. 28, 2019

(30) Foreign Application Priority Data

May 28, 2018 (DE) .......................... 102018208396.7

(51) Int. Cl.
*B60L 53/67* (2019.01)
*B60L 53/63* (2019.01)
(Continued)

(52) U.S. Cl.
CPC ................ *H02J 3/26* (2013.01); *B60L 53/63* (2019.02); *B60L 53/67* (2019.02); *H02J 7/0013* (2013.01); *H02J 2310/48* (2020.01)

(58) Field of Classification Search
CPC ................................. B60L 53/67; B60L 53/63
(Continued)

(56) References Cited

U.S. PATENT DOCUMENTS

2008/0258682 A1* 10/2008 Li ........................... B60L 50/66
320/109
2009/0189456 A1* 7/2009 Skutt ....................... H02J 3/386
307/87
(Continued)

FOREIGN PATENT DOCUMENTS

CN 203772983 U 8/2014
DE 102012221473 A1 5/2014
(Continued)

OTHER PUBLICATIONS

European Search Report dated Oct. 10, 2019 for copending European Patent Application No. EP19171592.
(Continued)

*Primary Examiner* — Richard Isla
*Assistant Examiner* — Dung V Bui
(74) *Attorney, Agent, or Firm* — Fishman Stewart PLLC

(57) ABSTRACT

A method of operating a charging system may include connecting the charging system to a power grid with a plurality of phases, measuring a plurality of phase currents of the plurality of phases at a balance point, and transmitting a plurality of performance targets to a plurality of electrical consumers connected to one of a plurality of charging points of the charging system. The method may also include changing a performance target of the plurality of performance targets for each of the plurality of charging points individually for a predetermined test time interval and measuring a corresponding change of the plurality of phase currents at the balance point. The method may further include, based on the corresponding change of the plurality of phase currents, determining whether an electrical consumer charges with a significant current and whether the electrical consumer could charge with a higher current.

20 Claims, 1 Drawing Sheet

(51) Int. Cl.
*H02J 3/26* (2006.01)
*H02J 7/00* (2006.01)

(58) Field of Classification Search
USPC .......................................................... 320/109
See application file for complete search history.

(56) References Cited

U.S. PATENT DOCUMENTS

| | | | | |
|---|---|---|---|---|
| 2010/0274407 | A1* | 10/2010 | Creed | H02J 3/14 700/295 |
| 2011/0266871 | A1* | 11/2011 | Thisted | B60L 55/00 307/46 |
| 2012/0095830 | A1* | 4/2012 | Contreras Delpiano | B60L 53/64 705/14.49 |
| 2012/0265459 | A1* | 10/2012 | Sfaelos | B60L 53/30 702/61 |
| 2012/0316691 | A1* | 12/2012 | Boardman | H02J 3/26 700/293 |
| 2013/0211988 | A1* | 8/2013 | Dorn | B60L 53/62 705/35 |
| 2014/0001850 | A1* | 1/2014 | Guillemin | H02J 3/00 307/31 |
| 2014/0111185 | A1* | 4/2014 | Cordero-Orille | H02J 7/02 324/76.77 |
| 2014/0221917 | A1 | 8/2014 | Oates, II et al. | |
| 2015/0333512 | A1* | 11/2015 | Saussele | G05F 1/10 700/287 |
| 2016/0105023 | A1* | 4/2016 | De Ridder | H02J 3/241 700/295 |
| 2016/0257216 | A1* | 9/2016 | Al-Awami | B60L 58/22 |
| 2017/0005701 | A1* | 1/2017 | Virden | H04B 1/16 |
| 2017/0271984 | A1* | 9/2017 | Kohn | G05B 15/02 |
| 2018/0123391 | A1* | 5/2018 | Lakamp | H02J 13/00028 |

FOREIGN PATENT DOCUMENTS

| | | |
|---|---|---|
| EP | 2735468 A2 | 5/2014 |
| EP | 2919352 A1 | 9/2015 |

OTHER PUBLICATIONS

English Abstract for EP2735468.
English Abstract for EP2919352.
English abstract for DE-102012221473.
English abstract for CN-203772983.

* cited by examiner

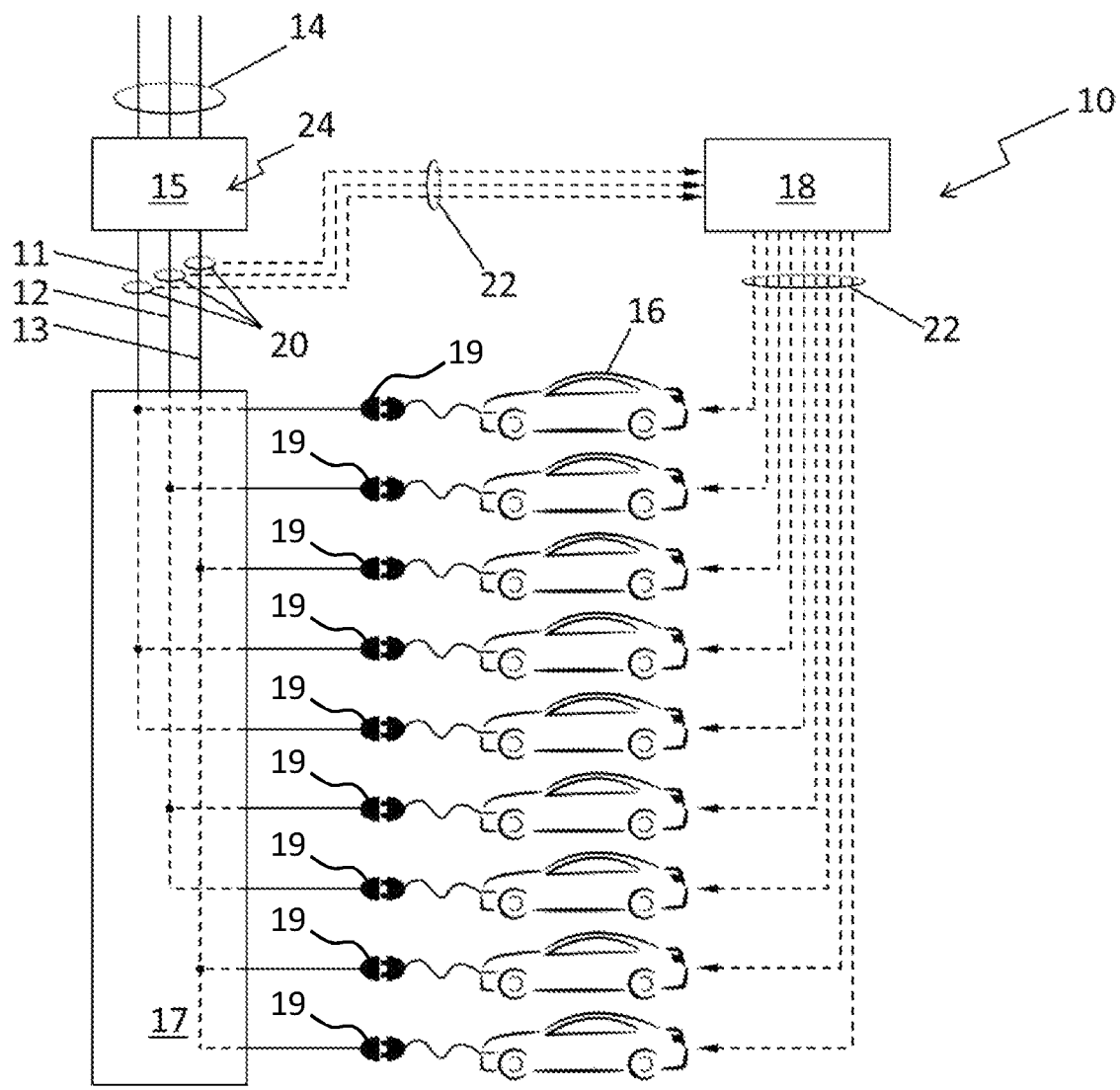

METHOD OF OPERATING A CHARGING SYSTEM WITH MULTIPLE CHARGING POINTS

CROSS-REFERENCE TO RELATED APPLICATIONS

This application claims priority to German Patent Application No. DE 10 2018 208 396.7 filed on May 28, 2018, the contents of which is hereby incorporated by reference in its entirety.

TECHNICAL FIELD

The invention relates to a method of operating a charging system with multiple charging points for charging electrical consumers, for example, electric vehicles, wherein the charging system is connected to a power grid having multiple phases.

BACKGROUND

Electric vehicles are presently charged with alternating current or with direct current in a single phase or multiple phases. The charging with alternating current is possible in this case according to standards in operation from 6 to 63 A on one or more phases. Many power supply companies and distribution grid operators require an avoidance of unbalanced load greater than 20 A by individual consumers. However, electric vehicles are on the market which charge in a single phase greater than 20 A. However, an unbalanced load can thus result, which is greater than the maximum unbalanced load specified by the power supply companies and distribution grid operators.

To avoid an unbalanced load, performance targets can be transmitted to the consumers, which specify how high the maximum available charging current is for the respective consumer to distribute the load as uniformly as possible onto the phases. However, the problem can occur that a consumer does not retrieve the entire available charging current, for example, if it is limited in principle by the charging regulator of the consumer, is reduced by user specification, or if the rechargeable battery is full. This can influence the regulation of the unbalanced load.

This is problematic in particular if the transmission of the performance targets only functions in one direction, so that the consumers cannot give feedback about the actual charging current.

SUMMARY

The invention is based on the object of providing an improved or at least different embodiment of a method of operating a charging current with multiple charging points, which is distinguished in particular by the avoidance of excessively high unbalanced loads.

This object is achieved according to the invention by the subject matter of the independent claim(s). Advantageous refinements are the subject matter of the dependent claim(s).

The invention is based on the basic concept of concluding, by changing the performance target at individual charging points, how high the charging current of the consumer is at this charging point and how high it could be. It is therefore provided according to the invention that the performance target is regularly changed for a predetermined test time interval for each charging point and the resulting change of the phase currents is measured at the balance point, and it is determined from the resulting change of the phase currents whether such a consumer is still connected at the charging point, whether the consumer charges with significant current, and/or whether the consumer could charge with a higher current. A controller of the charging system can thus recognize whether a regulation potential for the avoidance of unbalanced load is present at this charging point or not due to the consumer. The charging current of the consumer only follows the performance targets if a significant charging current is present and/or if the charging current can be increased. It is therefore only then possible to influence the unbalanced load by way of the change of the power target. This information is therefore valuable for the regulation of the unbalanced load.

The test time interval is preferably a short time window, for example, 5 to 30 seconds.

An advantageous solution provides that the change of the performance target is repeated after a predetermined repetition time interval at each charging point. The evaluation of the regulating potential of the individual consumers thus remains up-to-date. An advantageous time span for the repetition of the measurement is, for example, 120-600 seconds.

An advantageous option provides that the performance target is reduced for the predetermined test time interval. It can thus be recognized in particular whether the consumer is charging with a significant charging current or not. Such a change of the performance target can be, for example, a reduction of the charging current from 20 A to 10 A. If the corresponding phase current is thus also reduced by 10 A, i.e., the consumer has charged with 20 A and potentially will also again charge, as soon as the performance target is reset to the old value. However, if no or only a small change of the phase current occurs, this means that the consumer has not charged with the full 20 A. This consumer therefore cannot be used or can only be used to a smaller extent to regulate the unbalanced load.

A further advantageous solution provides that the performance target is increased for the predetermined test time interval. It can accordingly be recognized by an increase of the performance target whether the consumer would also use a greater charging current. The regulating potential of the individual consumers can thus be determined.

A further advantageous option provides that an unbalanced load of the phases is kept below an unbalanced load limiting value by transmitting a performance target to every electrical consumer connected for charging. A regulating option thus exists for the phase currents, so that the unbalanced load can be kept below the unbalanced load limiting value. At the same time, if an electrical consumer is connected for charging at all phases, a higher individual charging current can be achieved than with a method in which the maximum charging currents are throttled to a limiting value at which the unbalanced load limit cannot be exceeded. The unbalanced load limiting value is typically specified by the power supply company or the distributor grid operator. The unbalanced load limiting value is, for example, 20 A.

In the description and the appended claims, the unbalanced load is understood as the greatest presently occurring difference of the loads between each two arbitrary phases of the power grid at the balance point.

One advantageous option provides that the performance targets for the electrical consumers are set in such a way that any load difference between any possible pair of the phases of the power network at the balance point is less than the unbalanced load limiting value. The balanced load can thus remain below the unbalanced load limiting value.

In the description and the appended claims, a balance point is understood as a point of the power grid at which the unbalanced load limit is to be maintained. Such a balance point can be, for example, an electrical house connection, the output of a moderate voltage transformer, or a virtual power supply grid.

A further advantageous option provides that the performance target comprises how much charging power can presently be withdrawn in addition, or by how much the charging power has to be reduced. The phase currents can thus be regulated via the performance target, so that connected electrical consumers can be provided with the greatest possible electrical charging power, without the unbalanced load exceeding the unbalanced load limiting value.

A further particularly advantageous option provides that if the phase current of a phase is below a load limiting value and the phase current of this phase is less than the lowest measured phase current of another phase plus the unbalanced load limiting value, it is signalled via the performance target that additional charging power can be withdrawn. If power reserves are present, it is thus possible that these power reserves can also be utilized by the connected electrical consumer. The level of the additional power results by way of the interval to the respective limiting values, wherein the smaller of the two intervals to the limiting values is relevant for the possible power increase.

Furthermore, the particularly favourable option provides that if the phase current of a phase is above a load limiting value or the phase current of this phase is greater than the lowest measured phase current of one of the other phases plus the unbalanced load limiting value, it is signalled via the performance target that the charging power has to be reduced. Load changes on the power grid can thus be reacted to in order to prevent an overload or exceeding of the unbalanced load limiting value. The level of the power to be reduced results due to the respective exceeding of the load limiting value or the unbalanced load limiting value, wherein if both limiting values are exceeded, the higher value is relevant, so that after the reduction of the charging power is carried out, both limiting values are maintained.

One advantageous solution provides that the performance target comprises a present maximum available charging power. The performance target can thus signal to the connected electrical consumer how much maximum available charging power is standing by, for example, if the electrical consumer has just been connected. The regulating time until the optimum charging power is set can thus be shortened.

A further advantageous solution provides that the present maximum available charging power of the phase is determined in consideration of at least the present phase currents, a maximum permissible power of the respective phase, and a maximum permissible unbalanced load between the phases. It can thus be ensured in the determination of the maximum available charging power that the phase of the power grid is not overloaded, and the unbalanced load does not exceed the unbalanced load limiting value.

One advantageous variant provides that if an electrical consumer is connected for charging, it is determined to which phase the electrical consumer is connected, and a present maximum available charging power of the phase to which the electrical consumer is connected is determined, and the present maximum available charging power is transmitted to the electrical consumer. Thus, when the electrical consumer is connected, they receive the information about how much power they can withdraw for charging via the phase. The optimum utilization of the power grid is thus achieved in a particularly short time.

A further advantageous variant provides that the performance targets are selected in such a way that in addition an individual load of the individual phases is kept below a load limiting value in each case. The overload of the individual phases of the power grid is thus prevented, so that more secure and stable operation is enabled. The load limiting value is advantageously given by a maximum permissible load at the balance point.

One advantageous option provides that the phase currents at the balance point are progressively determined, and the performance target for the electrical consumers connected for charging is adapted progressively therefrom and transmitted to the respective electrical consumer. It is thus possible to react to changes of the load conditions at the individual phases. In particular if, for example, the charge of the electrical consumer is ended at the first phase and power is no longer withdrawn, this can result in an unbalanced load if electrical consumers are hanging on the other phases. This can be recognized by the progressive monitoring and the remaining electrical consumers can thus be throttled in the charging power thereof, so that the unbalanced load limiting value is not exceeded.

A further advantageous option provides that the power grid is a three-phase rotary current grid. Such three-phase rotary current grids are typically provided by the power supply company.

An advantageous variant provides that the electrical consumers set the retrieved charging power on the basis of the transmitted performance targets. A regulation of the charging power thus actually takes place, so that the power limiting values and the unbalanced load limiting values can be maintained. It is obvious that the electrical consumers do not necessarily have to retrieve the maximum available charging power.

A further advantageous variant provides that the performance targets are transmitted by a PWM signal. Such PWM signals are easy to generate and easy to interpret, so that a very simple transmission of the performance targets is thus possible.

A particularly advantageous solution provides that the electrical consumers connected for charging are electric vehicles. Very high charging powers occur in particular with electric vehicles in order to shorten the charging time of the electric vehicles, so that the problems of the unbalanced load and the overload of individual phases are particularly relevant.

In the description and the appended claims, electric vehicles are understood as motor vehicles which are driven at least partially by an electric drive and have an electric energy accumulator.

Further important features and advantages of the invention result from the dependent claims, the drawing, and the associated description of the FIGURES on the basis of the drawing.

It is apparent that the above-mentioned features and the features to be explained hereafter are usable not only in the respective specified combination, but rather also in other combinations or alone, without leaving the scope of the present invention.

Preferred exemplary embodiments of the invention are illustrated in the drawing and will be explained in greater detail in the following description.

BRIEF DESCRIPTION OF THE DRAWING

The single FIGURE shows a block diagram of a charging system, on which the method according to the invention can be carried out.

DETAILED DESCRIPTION

A system 10 shown in the FIGURE comprises a power grid terminal 15 with multiple phases 14, for example, a first phase 11, a second phase 12, and a third phase 13, to which electrical consumers, for example, electric vehicles 16, referred to as electric vehicle 16 hereafter, can be connected to charge the electric vehicles 16. The electric vehicles 16 are each connected in this case via a charging point 19 to a sub-distribution unit 17. Furthermore, a control unit 18 is provided, which monitors the system 10. For this purpose, one phase current measuring unit 20 is provided for each phase 11, 12, 13, 14, which transmits the values of the measured phase currents to the control unit 18. Data connections 22 are preferably provided for the transmission of the values of the measured phase currents. Furthermore, data connections 22 are provided between the control unit 18 and the electric vehicles 16, via which a performance target can be transmitted from the control unit 18 to the electric vehicles 16.

Alternatively to the phase current measuring unit 20, data of a networked current meter can also be analysed to conclude the phase currents.

The control unit 18 controls the electric vehicles 16 in such a way that the currents withdrawn by the electric vehicles 16 via the individual phases 11, 12, 13, 14 are such that the individual phases 11, 12, 13, 14 are loaded within predetermined operating parameters.

These operating parameters comprise in particular a maximum power or a maximum phase current of the phases 11, 12, 13, 14. Furthermore, the operating parameters can also comprise a maximum unbalanced load between the phases 11, 12, 13, 14. The unbalanced load is defined by the greatest difference of the powers which are retrieved via the phases 11, 12, 13, 14. In particular, the unbalanced load is the load difference between the load of the phase 11, 12, 13, 14, via which the greatest power is delivered and the load of the phase 11, 12, 13, 14, via which the least power is delivered. The load or the unbalanced load can be defined in this case, for example, via the electric power or the electric current.

If a motor vehicle 16 is connected for charging to one of the phases 11, 12, 13, 14, the control unit determines how high the maximum available charging power is for the motor vehicle 16 and transmits this present maximum available charging power to this motor vehicle 16. The motor vehicle 16 will then acquire at most this charging power via the phase 11, 12, 13, 14. In the further charging procedure, the control unit 18 will progressively monitor the phase currents of the individual phases 11, 12, 13, 14 and possibly transmit performance targets to the motor vehicles 16, which signal to the motor vehicles 16 that either more charging power can be retrieved, or the charging power has to be reduced.

If, for example, only a single electric vehicle 16 is connected to one of the phases 11, 12, 13, 14, the maximum available charging power is given by the maximum unbalanced load. The maximum permitted unbalanced load is typically 20 A. As a result, the electric vehicle 16 can only charge with 20 A.

If a second electric vehicle 16 is connected to a further phase 11, 12, 13, 14, it can also be charged with 20 A. Finally, if an electric vehicle 16 is also connected to a third phase 11, 12, 13, 14, a load balance thus results, whereby the maximum charging power is no longer limited by the unbalanced load, but rather by the individual maximum load at the individual phases 11, 12, 13, 14.

Since the charging power of the electric vehicles 16 is not necessarily always the maximum available charging power, a progressive monitoring of the phase currents is also performed with three connected electric vehicles 16, to be able to throttle charging currents of individual electric vehicles 16 if necessary, in order to prevent exceeding of the maximum permissible unbalanced load.

It is obvious that more than one electric vehicle 16 can also be connected for charging to a single phase 11, 12, 13, 14. Therefore, more electric vehicles 16 can be charged simultaneously than phases 11, 12, 13, 14 are available on the power grid.

To determine how high the charging current or charging power acquired by the respective connected electric vehicles 16 is, the performance target is regularly changed at a charging point 19. In this case, the phase currents are observed at the balance point 24. If the change of the phase current corresponds to the change of the performance target, the electric vehicle 16 has charged with the full charging current according to the performance target.

However, if the change of the phase current does not correspond to the change of the performance target, the electric vehicle 16 has charged with a lower charging current. This means that the control unit 18 has to take into consideration that the electric vehicle 16 connected at this charging point 19 will not retrieve the maximum charging current. The performance targets for the other charging points 19 have to be changed accordingly to keep the unbalanced load within the permissible limits.

It can thus be recognized by a reduction of the performance target how high the charging current of the electric vehicle 16 is, or whether the electric vehicle 16 has ended its charging procedure. It can be recognized by an increase of the performance target whether the respective connected electric vehicle 16 would acquire a greater charging current and thus enable a further regulation of the unbalanced load. The regulation potential for the unbalanced load of the individual electric vehicles 16 can thus be determined.

The change of the performance target is repeated for each charging point 19 after a repetition time interval. The judgment of the regulation potentials thus remains up-to-date.

The invention claimed is:

1. A method of operating a charging system with multiple charging points for charging electrical consumers, comprising:
    connecting the charging system to a power grid with a plurality of phases;
    measuring a plurality of phase currents of the plurality of phases of the power grid at a balance point;
    transmitting a plurality of performance targets to a plurality of electrical consumers connected to one of a plurality of charging points of the charging system;
    changing a performance target of the plurality of performance targets for each of the plurality of charging points individually for a predetermined test time interval and measuring a corresponding change of the plurality of phase currents at the balance point; and
    based on the corresponding change of the plurality of phase currents, determining at least one of:
        whether an electrical consumer of the plurality of electrical consumers is still connected to one of the plurality of charging points;

whether the electrical consumer of the plurality of electrical consumers charges with a significant current; and whether the electrical consumer of the plurality of electrical consumers could charge with a higher current;

wherein the plurality of performance targets are transmitted to the plurality of electrical consumers via a control unit;

wherein changing the performance target for each of the plurality of charging points individually for the predetermined test time interval includes transmitting the changed performance target to a corresponding electrical consumer via the control unit; and wherein the corresponding change of the plurality of phase currents at the balance point is provided by the changed performance target.

2. The method according to claim 1, wherein changing the performance target is repeated at each of the plurality of charging points after a predetermined repetition time interval.

3. The method according to claim 1, wherein changing the performance target includes one of increasing and reducing the performance target for the test time interval.

4. The method according to claim 1, further comprising keeping an unbalanced load of the plurality of phases below an unbalanced load limiting value via transmitting an adapted performance target to each of the plurality of electrical consumers connected for charging.

5. The method according to claim 1, wherein the performance target includes one of how much a charging power can presently additionally be withdrawn and by how much the charging power has to be reduced.

6. The method according to claim 5, further comprising:
when a phase current of a phase of the plurality of phases is below a load limiting value and the phase current is less than a smallest measured phase current of another one of the plurality of phases plus an unbalanced load limiting value, signaling via the performance target that additional charging power can be withdrawn; and when one of i) the phase current of the phase is above the load limiting value and ii) the phase current of the phase is greater than the smallest measured phase current of another one of the plurality of phases plus the unbalanced load limiting value, signaling via the performance target that the charging power has to be reduced.

7. The method according to claim 1, wherein the performance target includes a present maximum available charging power.

8. The method according to claim 7, further comprising determining the present maximum available charging power of a phase of the plurality of phases based on at least a present level of the plurality of phase currents, a maximum permissible power of the phase, and a maximum permissible unbalanced load between the plurality of phases.

9. The method according to claim 7, further comprising, when an electrical consumer of the plurality of electrical consumers is connected for charging, determining to which phase of the plurality of phases the electrical consumer is connected, determining a present maximum available charging power of the phase to which the electrical consumer is connected, and transmitting the present maximum available charging power to the electrical consumer.

10. The method according to claim 1, further comprising keeping an individual load of each individual phase of the plurality of phases below a load limiting value via selection of the plurality of performance targets.

11. The method according to claim 1, further comprising:
progressively determining the plurality of phase currents at the balance point; and progressively adapting the plurality of performance targets for the plurality of electrical consumers based on the progressively determined plurality of phase currents and transmitting the progressively adapted plurality of performance targets to the plurality of electrical consumers.

12. The method according to claim 1, further comprising setting a retrieved charging power via the plurality of electrical consumers based on the transmitted plurality of performance targets.

13. The method according to claim 1, wherein:
transmitting the plurality of performance targets to the plurality of electrical consumers includes communicating to the plurality of electrical consumers at least one of (i) an amount by which a charging power drawn by the respective electrical consumer may be increased, (ii) an amount by which the charging power drawn by the respective electrical consumer must be reduced, and (iii) a present maximum charging power available to the respective electrical consumer; and changing the performance target for each of the plurality of charging points includes changing at least one of (i) the amount by which a charging power drawn by the respective electrical consumer may be increased, (ii) the amount by which the charging power drawn by the respective electrical consumer must be reduced, and (iii) the present maximum charging power available to the respective electrical consumer, that is communicated to the plurality of electrical consumers.

14. The method according to claim 1, wherein transmitting the plurality of performance targets to the plurality of electrical consumers and transmitting the changed performance target to the corresponding electrical consumer each includes communicating information to each of the plurality of electrical consumers regarding an amount of power the respective electrical consumer may withdraw.

15. The method according to claim 2, wherein:
the predetermined test time interval is 5 to 30 seconds; and the predetermined repetition time interval is 120 to 600 seconds.

16. The method according to claim 1, wherein transmitting the plurality of performance targets to the plurality of electrical consumers includes sending, via the control unit, a pulse-width modulated (PWM) signal to at least one of the plurality of electrical consumers.

17. The method according to claim 1, further comprising:
determining that an electrical consumer of the plurality of electrical consumers has been charging with a full charging current according to the respective performance target when the measured change of the respective phase current corresponds to a change of the respective performance target; and determining that the electrical consumer has been charging with less than the full charging current according to the respective performance target when the measured change of the respective phase current does not correspond to the change of the respective performance target.

18. A method of operating a charging system, comprising:
connecting the charging system to a power grid with a plurality of phases;

measuring a plurality of phase currents of the plurality of phases of the power grid at a balance point, each of the plurality of phases having a respective phase current of the plurality of phase currents;

transmitting a plurality of performance targets to a plurality of electrical consumers connected to one of a plurality of charging points of the charging system;

changing a performance target of the plurality of performance targets for each of the plurality of charging points individually for a predetermined test time interval and measuring a corresponding change of the plurality of phase currents at the balance point;

based on the corresponding change of the plurality of phase currents, determining at least one of:
  whether a consumer of the plurality of electrical consumers is still connected to one of the plurality of charging points;
  whether the consumer of the plurality of electrical consumers charges with a significant current; and
  whether the consumer of the plurality of electrical consumers could charge with a higher current;

keeping an individual load of each individual phase of the plurality of phases below a load limiting value via selection of the plurality of performance targets;

keeping an unbalanced load of the plurality of phases below an unbalanced load limiting value via transmitting an adapted performance target to each of the plurality of electrical consumers;

wherein transmitting the plurality of performance targets to the plurality of electrical consumers includes communicating to the plurality of electrical consumers at least one of (i) an amount by which a charging power drawn by a respective electrical consumer may be increased, (ii) an amount by which the charging power drawn by the respective electrical consumer must be reduced, and (iii) a present maximum charging power available to the respective electrical consumer; and wherein changing the performance target for each of the plurality of charging points includes changing at least one of (i) the amount by which a charging power drawn by the respective electrical consumer may be increased, (ii) the amount by which the charging power drawn by the respective electrical consumer must be reduced, and (iii) the present maximum charging power available to the respective electrical consumer, that is communicated to the plurality of electrical consumers.

19. The method according to claim 18, further comprising:

signaling via the performance target that an additional amount of a charging power can be withdrawn when the respective phase current of one of the plurality of phases is below the load limiting value and the respective phase current is less than a smallest measured phase current of another one of the plurality of phases plus the unbalanced load limiting value; and signaling via the performance target that an amount of the charging power being withdrawn has to be reduced when at least one of:
  the respective phase current of one of the plurality of phases is above the load limiting value; and
  the respective phase current of one of the plurality of phases is greater than the smallest measured phase current of another one of the plurality of phases plus the unbalanced load limiting value.

20. A method of operating a charging system, comprising:

connecting the charging system to a power grid with a plurality of phases;

determining to which phase of the plurality of phases each of a plurality of electrical consumers is connected for charging;

measuring a plurality of phase currents of the plurality of phases of the power grid at a balance point, each of the plurality of phases having a respective phase current of the plurality of phase currents;

determining a present maximum available charging power of the phase to which each of the plurality of electrical consumers is connected;

transmitting a plurality of performance targets from a control unit to a plurality of electrical consumers connected to one of a plurality of charging points of the charging system, the plurality of performance targets including the present maximum available charging power;

changing a performance target of the plurality of performance targets for each of the plurality of charging points individually for a predetermined test time interval, transmitting the changed performance target from the control unit to the corresponding electrical consumer, and measuring a corresponding change of the plurality of phase currents at the balance point resulting from changing the performance target; and based on the corresponding change of the plurality of phase currents, determining at least one of:
  whether a consumer of the plurality of electrical consumers is still connected to one of the plurality of charging points;
  whether the consumer of the plurality of electrical consumers charges with a significant current; and
  whether the consumer of the plurality of electrical consumers could charge with a higher current.

* * * * *